(12) United States Patent
Sibley et al.

(10) Patent No.: US 8,386,364 B2
(45) Date of Patent: Feb. 26, 2013

(54) SYSTEM FOR MULTI-LEG TRADING

(75) Inventors: Shaun P. Sibley, Berkshire (GB); David P. Watts, Essex (GB); Leigh B. Henson, London (GB)

(73) Assignee: Reuters Limited (GB)

( * ) Notice: Subject to any disclaimer, the term of this patent is extended or adjusted under 35 U.S.C. 154(b) by 946 days.

(21) Appl. No.: 11/534,020

(22) Filed: Sep. 21, 2006

(65) Prior Publication Data

US 2008/0077521 A1   Mar. 27, 2008

(51) Int. Cl.
*G06Q 40/00* (2006.01)

(52) U.S. Cl. .......................... 705/37; 705/35

(58) Field of Classification Search ................ 705/1, 35, 705/36 R, 37
See application file for complete search history.

(56) References Cited

U.S. PATENT DOCUMENTS

| | | |
|---|---|---|
| 4,750,135 A | 6/1988 | Boilen |
| 5,077,665 A | 12/1991 | Silverman et al. |
| 5,727,165 A | 3/1998 | Ordish et al. |
| 6,112,189 A | 8/2000 | Rickard et al. |
| 6,272,474 B1 | 8/2001 | Garcia |
| 6,282,521 B1 | 8/2001 | Howorka |
| 6,311,178 B1 | 10/2001 | Bi et al. |
| 6,533,346 B2 | 3/2003 | Yu |
| 6,553,346 B1 | 4/2003 | Walker et al. |
| 6,751,597 B1 | 6/2004 | Brodsky et al. |
| 6,766,304 B2 | 7/2004 | Kemp, II et al. |
| 6,772,132 B1 | 8/2004 | Kemp, II et al. |
| 6,912,511 B1 | 6/2005 | Eliezer et al. |
| 2002/0004774 A1* | 1/2002 | Defarlo ............................ 705/36 |
| 2005/0203826 A1 | 9/2005 | Farrell et al. |
| 2005/0222936 A1 | 10/2005 | Panariti et al. |
| 2005/0283415 A1 | 12/2005 | Studnitzer et al. |
| 2006/0015436 A1 | 1/2006 | Burns et al. |
| 2006/0015440 A1 | 1/2006 | Penney |
| 2006/0015442 A1 | 1/2006 | Burkhardt et al. |
| 2006/0015446 A1 | 1/2006 | Burkhardt et al. |
| 2006/0026090 A1* | 2/2006 | Balabon ........................... 705/37 |
| 2006/0036531 A1 | 2/2006 | Jackson et al. |
| 2006/0080223 A1* | 4/2006 | Rosenthal et al. ............... 705/37 |
| 2007/0083458 A1* | 4/2007 | Rosenthal et al. ............... 705/37 |

OTHER PUBLICATIONS

Optimal Limit Order Choice Author(s): John K. Wald and H. T. Horrigan Source: The Journal of Business, vol. 78, No. 2 (Mar. 2005), pp. 597-620 Published by: The University of Chicago PressStable URL: http://www.jstor.org/stable/10.1086/427640 .*
Optimal slice of a VWAP trade, Hizuru Konishi, Tokyo-Mitsubishi Securities, University of Tsukuba, Japan, Journal of Financial Markets, vol. 5, Issue 2, Apr. 2002, pp. 197-221.*
Brochure: Reuters Order Routing for Commodities, dated 2005.
Reuters Order Routing for Commodities 8.3 Administration Guide, Version 1.0.0, published prior to Sep. 21, 2006.

* cited by examiner

*Primary Examiner* — Olabode Akintola
*Assistant Examiner* — Kellie Campbell
(74) *Attorney, Agent, or Firm* — Banner & Witcoff, Ltd.

(57) ABSTRACT

A computerized entity, system and method for monitoring, determining and/or presenting risk to a trader for multi-leg transactions is provided. The system may include a trading terminal that can calculate the current price for a synthetic instrument representing a multi-leg trade based on trading data for each financial instrument of the multi-leg trade. The trading terminal may provide indicia of the likelihood of success of completing each single-leg trade of the multi-leg trade.

23 Claims, 7 Drawing Sheets

| Instrument 1 Price / Probability | | Instrument 2 Price / Probability | | Instrument 3 Price / Probability | |
|---|---|---|---|---|---|
| $100.00 | 80% | $25.55 | 40% | $70.38 | 72% |

| Synthetic Instrument Price / Probability | |
|---|---|
| $65.10 | 57% |

| Instrument 1 Price / Probability | | Instrument 2 Price / Probability | | Instrument 3 Price / Probability | |
|---|---|---|---|---|---|
| $100.00 | 80% | $25.55 | 40% | $70.38 | 72% |

Synthetic Instrument Price / Probability

| $65.10 | 57% |
|---|---|

SYSTEM FOR MULTI-LEG TRADING

BACKGROUND

Aspects of the present invention relate to computerized devices, systems and/or methods for monitoring, performing and/or determining risk for multi-leg transactions.

Most financial instruments are traded on an exchange by brokers/traders via electronic trading terminals of an electronic trading system. The terminals typically receive large amounts of data for one or more markets and financial instruments of particular interest to a trader on a substantially real-time basis. When trading a single instrument (a single-leg trade) the trader typically monitors the frequency with which this instrument is trading, the direction of price movement and potentially the depth-of-market if available. As a result the trader will have a good level of confidence in achieving a desired trade at a particular price and volume.

In a multi-leg trading scenario, the trader may create a synthetic instrument to improve trading efficiency. In this scenario the synthetic instrument provides the trader with a calculated best bid and offer price for a given volume and the ability to execute all legs of the synthetic with a single instruction. However, the ability to monitor the frequency of trading, direction of price movement and depth of market for each of the underlying legs becomes more challenging. The trader has no guarantee that the system will achieve execution on all underlying legs or at the expected price. Multi-leg trades therefore have greater risk than single-leg trades, and this risk increases if one or more legs are in less liquid markets.

SUMMARY

This summary is provided to introduce a selection of concepts in a simplified form that are further described below in the Detailed Description. This summary is not intended to identify key features or essential features of the claimed subject matter.

Aspects of the present invention address one or more issues described above, thereby monitoring, determining and/or presenting risk to a trader for multi-leg transactions.

In some aspects of the invention, a trading terminal can calculate the current price for a synthetic instrument representing a multi-leg trade based on trading data for each financial instrument of the multi-leg trade. Other aspects of the present invention relate to a trading system that can provide indicia of the likelihood of success of completing each single-leg trade of a multi-leg trade.

These and other aspects of the disclosure will be apparent upon consideration of the following detailed description of illustrative embodiments.

BRIEF DESCRIPTION

A more complete understanding of the present invention and the potential advantages thereof may be acquired by referring to the following description of illustrative embodiments in consideration of the accompanying drawings.

DETAILED DESCRIPTION

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

The following description is divided into subsections to assist the reader. These subsections are included for illustrative purposes only as aspects of the invention may include one or more of the components, processes, and APIs described below:
1. Conventional Trading Processes.
2. Overview of example multi-leg trading and related success metrics.
3. Overview of an example electronic trading system.
4. Trader API.
5. Overview of an example multi-leg trade.
6. Examples.

1. CONVENTIONAL TRADING PROCESSES

In general, financial markets have three primary steps in their trading processes: Market Price Discovery, Transaction Execution, and Transaction Settlement.

Market Price Discovery is the process by which an executable Bid (the price at which someone is willing to buy) and an executable Offer (the price at which someone is willing to sell) are created and disseminated to market participants. In general terms, this process involves the collection of a "central limit order book" of bids and offers from all participants active in the market place. The term "all participants" generally refers to those who are interested in buying or selling a particular instrument. The central limit order book (also referred to as "the book" or "the CLOB") is arranged according to the rules of the market in a "price-time priority" sequence. This gives priority to the highest Bids and lowest Offers. This priority ordering also resolves ties in price by sequencing according to time. In short, the first highest Bid has priority over all other bids in the marketplace. In almost all cases, the book of bids and offers is anonymous, meaning that the identity of bidders and offerors is not revealed to market participants prior to a trade. Other variations on CLOB sequencing are possible, for example Prize/Size/Time priority, in which larger orders have priority over smaller orders of the same price, even if they arrived later in time. The operator of the market typically determines the priority sequencing rules of the CLOB based on the requirements of the marketplace, in order to maximize liquidity and encourage involvement of the largest number of participants. In some markets a central regulatory authority may dictate the priority rules of the CLOB.

Markets may include a number of participants. The participants are not always equal, however, in the eyes of other market participants. Depending on the characteristics of a particular market, not all bids and offers are always available for trading to any particular participant. For example, a seller of securities may only want to sell to an institution, and not to a private individual. Or a buyer of foreign currency may not be able to settle with a foreign institution, so his bid is limited for access by domestic counterparties.

To account for these limitations on the trading abilities for a given market participant, the market price discovery process may filter the book of bids and offers so that participants can only see those orders (bids and offers) that are actually available to them for transacting. The filtering process must take account of any limitations imposed by the bidder or offeror, and any limitations imposed by the recipient. This is known as bi-lateral filtering.

Transaction Execution is the process by which a bidder and an offeror (a buyer and a seller) are matched by a broker in order that they may complete a transaction. The matching process is typically performed by a computer in active markets, but it may be performed by a human being (a so-called "voice broker") in some markets. When an order is fully matched, it is removed from the book so that other participants do not mistakenly believe the order is still available for transacting. In some cases, the process of Transaction Execution involves additional steps of negotiation in case the fall detail of the intended transaction is not captured simply by the price that was revealed in price discovery. For example, it may be necessary for the transacting parties to agree on settlement dates, on quantity, on reference prices, and so forth. These parameters to a trade may not have been conditions on the original bids and offers and, hence, could not be matched prior to bringing the two parties together.

Once two parties have agreed to execute a trade, they are obligated to one another to complete the settlement of the transaction. The settlement process is the procedure used to effect the actual exchange of value between the parties. For example, in a securities transaction, a buyer and a seller agree to trade, e.g., 1000 shares of stock X at a price of $10 per share. This transaction is scheduled for settlement three days after the trade date. On or before the settlement date, the seller must make arrangements for delivery of 1000 shares of stock to the buyer and the buyer must make arrangements for delivery of $10,000 to the seller. Once both of these exchanges are complete, the transaction is said to have been fully settled.

In some complex financial transactions, the settlement may actually take place on multiple dates. For example, in an Interest Rate Swap the parties agree to exchange payments every six months over a period of possibly several years. In a Foreign Exchange swap, a first settlement occurs two days following the transaction and a second settlement occurs anywhere from three days to a year or more later.

2. OVERVIEW OF EXAMPLE MULTI-LEG TRADING AND RELATED SUCCESS METRICS

Success metrics for multi-leg trading (SMMT) is generally a process that can be implemented by a trading terminal and/or electronic trading system to provide a trader with a numeric and/or graphical view on the probability of a desired multi-leg trade completing at an expected price for a given volume, as well as perhaps the probability of each leg of the trade completing. Dependent upon the calculated probability, the trader can determine whether or not to execute the multi-leg trade.

As transaction products deliver more sophisticated multiple asset class trading across multiple execution venues and instrument types (both derivative and OTC cash), the use and complexity of synthetic instruments will likely increase. As a result, the value of SMMT will increase in both end user and program trading environments.

SMMT can be applied to a wide variety of multi-leg trade scenarios, such as the following example multi-leg trade scenarios:

An inter-month or inter-product futures spread;
Arbitrage trading of identical instruments on different execution venues e.g. cash or derivative;
Geographic arbitrage trading in physical markets would include for example, simultaneous selling of electricity at delivery point A purchasing of electricity at delivery point B, and purchasing of wire delivery from B to A.
Trading of synthetic instruments such as crack or spark spreads involving simultaneous trades in physical or derivative energy contracts.
Cash or derivative trades involving simultaneous currency transactions to offset FX risk
Market standard trading strategies such as bull spreads, bear spreads, straddles, strangles.

Figure 4A:
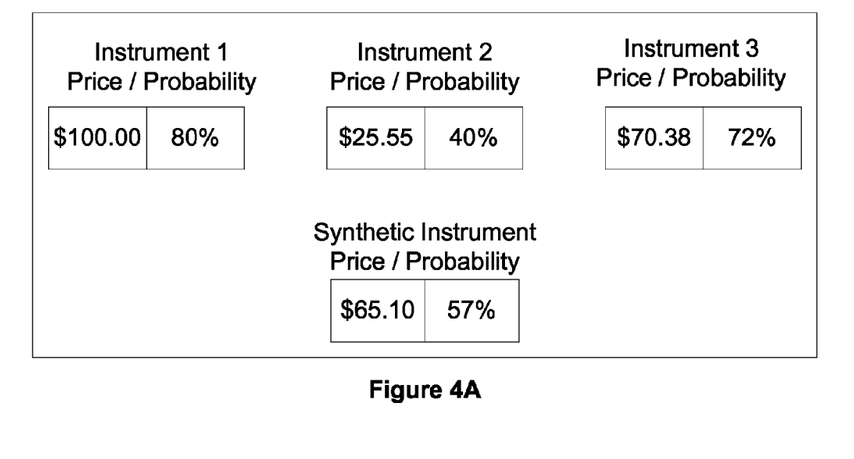
FIGS. 4A-4C show various example displays related to multi-leg transactions and the probabilities of success for executing the same in accordance with aspects of the present invention.
Figure 4B:
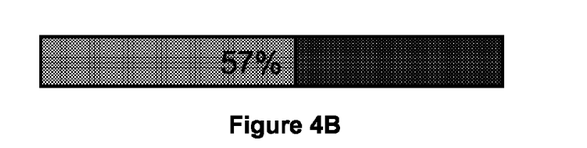

SMMT can include a numeric and/or graphical representation of the probability that all legs in the multi-leg trade will be executed and at an expected price for a given volume. Within a trading screen or an order entry form the Success Metric may be represented as shown in FIGS. 4A and/or 4B.

The Success Metric for the multi-leg trade can be calculated from equivalent Success Metric values for each of the underlying leg instruments. These values can in turn be calculated from factors such as the current price, volume, depth of market, frequency of trade, or and/or other factors for each underlying leg. The frequency of trade can be calculated over a defined period of time.

The Success Metric values for the underlying legs could be calculated by individual trading terminals. It could also be calculated centrally by the trading system(s) to enable more efficient calculation of the Success Metric value for the synthetic instrument by the trading terminals.

3. OVERVIEW OF AN EXAMPLE ELECTRONIC TRADING SYSTEM

Figure 1:
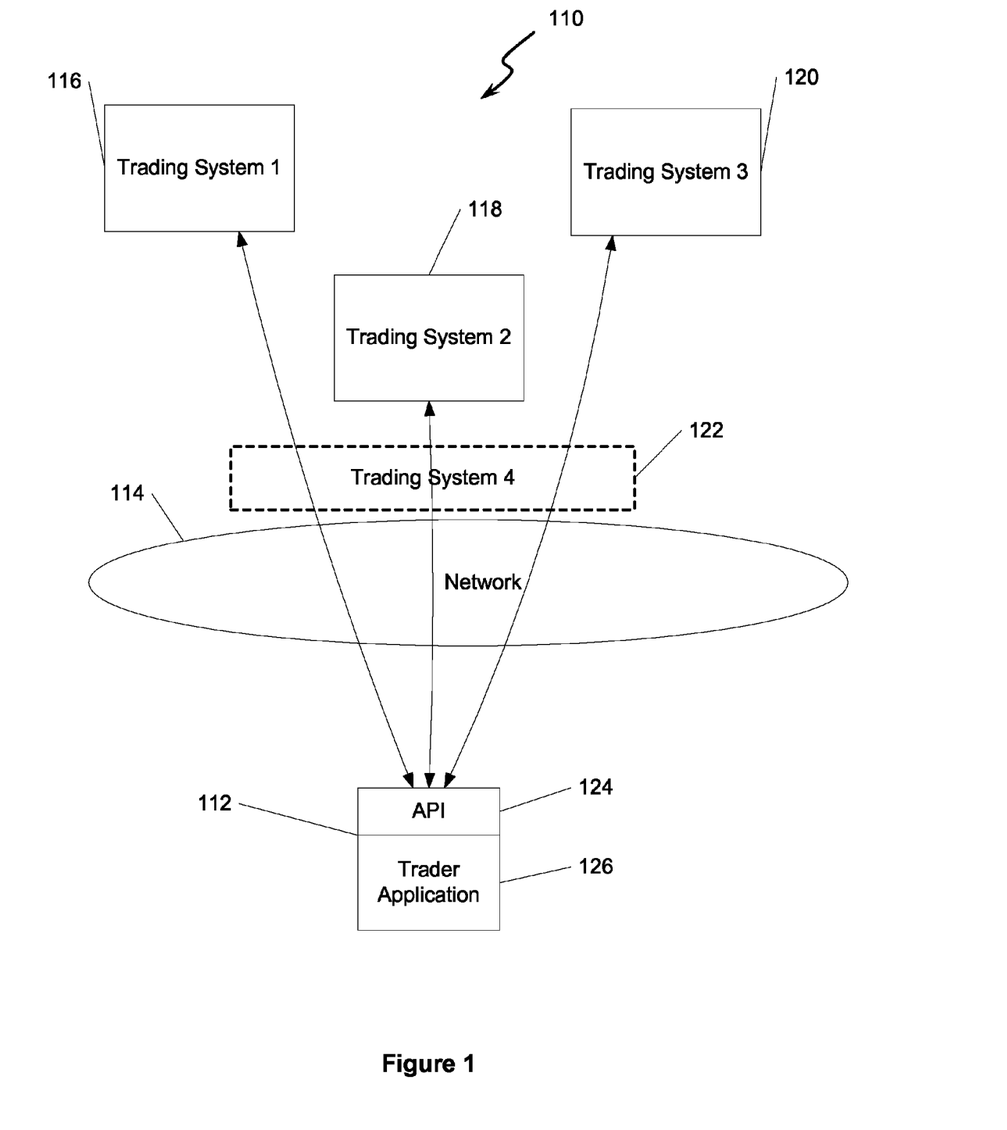
FIG. 1 shows a general overview in accordance with aspects of the present invention.

FIG. 1 relates to an electronic trading system 110 that integrates a number of processes, such as price discovery and transaction execution, for handling trading of financial instruments. As shown, electronic trading system 110 may include multiple trading systems 116, 118, 120 and 122. As noted above, the principles of the invention could apply to a variety of financial instruments and transactions, such as foreign exchange transaction, securities, bonds, interest rate derivatives, commodities, energy, etc. trading one or more financial exchanges via trading systems 116, 118, 120 and 122.

FIG. 1 shows trading systems 116, 118 and 120 that exchange information via network 114, which may include the Internet, with multiple trading terminals represented by trading terminal 112. Optionally, electronic trading system 110 may include a central trading system 122 that communicates with one or more of trading systems 116, 118 and 120 to provide data regarding the multiple systems to trading terminal 112.

Traders may trade with each other using trading terminals. The trading terminals may include a trader application 126 that handles the local display of trading information and accepting and forwarding actions from a trader. The trading terminals may include dedicated trading computers, general purpose computers running a local trading application, a computer, or other computing system that provides an Internet-based trading application and combinations there between. Further, the trader applications may optionally be a "black-box" that performs algorithmic trading without local display or actions from a trader.

For purposes herein, the functionality that receives information from a trader and provides information to a trader is referred to as a "trader application", represented in FIG. 1 by trader 1 application 126. The trader application 126 may execute on a computer located at each market participant (trader) location. The trader application 126 may be a program that provides a graphical user interface (GUI) with trading functionality, an automated program trading application, or a hybrid of these two programs. The trader may enter trade order messages in the trader applications 126 in response to a viewed order book.

Each trader application 126 communicates (directly or indirectly) with trading systems 116, 118 120 and 122 via a network 114. For instance, network 114 may be a wide area network or any other type of network. The network 114 may be the public Internet, a privately managed TCP/IP network, or any other form of communications network that allows trading applications to communicate at high speed, and with low latency, with the trading terminals 112. The trader application 126 of each trading terminal can communicate with the one or more trading systems using one or more application programming interfaces (APIs) 124.

The above description relates to the physical connections between the components shown in FIG. 1. Example processes performed by the components of FIG. 1 are described below.

Trader applications 126 are available to market participants. Using the Trader applications 126, traders can enter bids and offers, cancel unmatched open orders, create synthetic instruments for multi-leg trades, and execute single and multi-leg trades as are permitted on the marketplace.

The trader applications 126 may display a central order book for various financial instruments include the financial instruments for one or more legs of a multi-leg transaction. The central order book may be dynamically updated with the bids and offers available in the marketplace. The display may be updated in real time as new orders are received by the marketplace. The trader applications 126 may also display and store a record of all executed transactions that are reported by the trading system(s) for a single trading workstation and/or a single trader. As further described below, the trader applications may also calculate and/or display the probability of success for executing single-leg transactions and/or multi-leg transactions.

The trading systems can receive the orders and cancellations from all trader applications 126 of the particular system, and can organize these orders into a central order book according to the priority rules of the marketplace.

Network 114 provides a medium through which the central order book for each trading system is provided to all market participants. Network 114 may provide a high speed, low latency connection between trader applications 126 and trading systems 116, 118, 120 and 122.

The trading systems 116, 118, 120 and 122 can perform a number of functions. For instance, the trading systems can match bids and offers, or buy and sell orders, according to the rules of the marketplace, removes such matched bids and offers from their central order book, and notifies the trader applications 126 which originated the matched bids and/or offers of the resulting trade executions as described above. Each side of a single-leg trade may be associated with an individual trader entity (for instance, the trader that submitted the bid or offer).

In at least one illustrative implementation of the system of FIG. 1, the systems may include computers, stored programs, and communications networks and be operated so as to not require manual intervention under normal trading operations. Accordingly, this illustrative representation of the system of FIG. 1 may allow fast and efficient trading of multi-leg trades over multiple trading systems.

4. TRADER API

Figure 6:
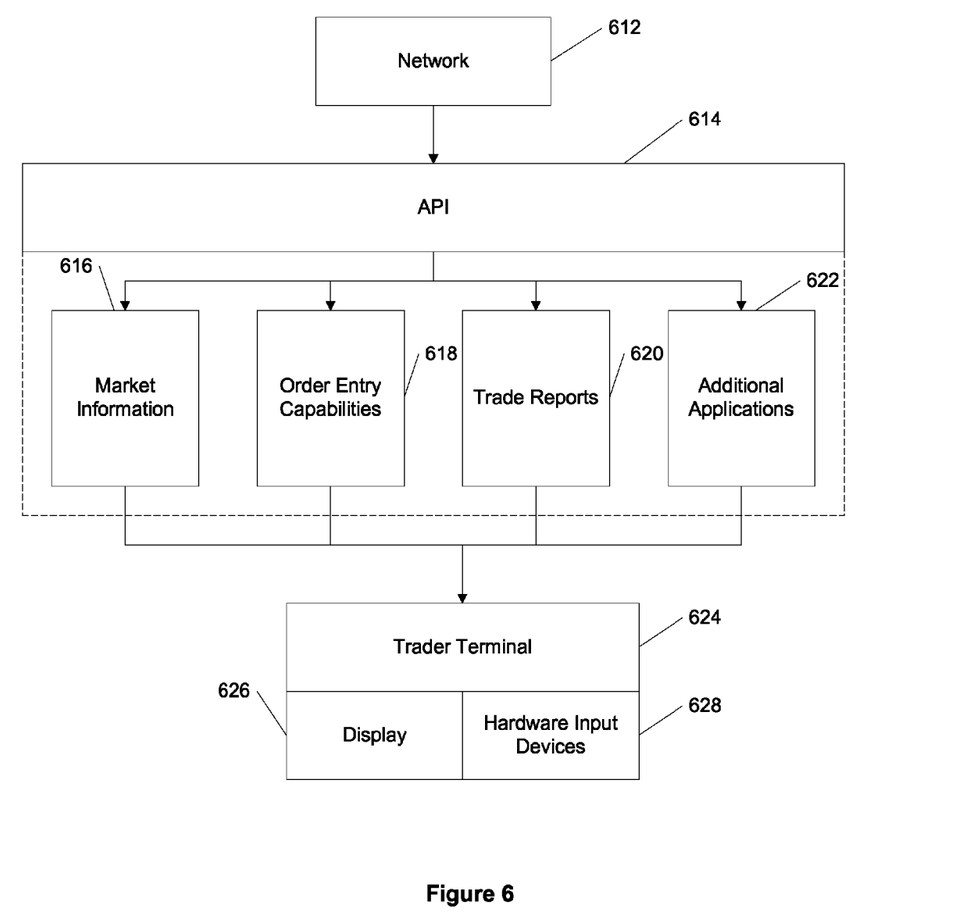
FIG. 6 shows an application programming interface and trading terminal that may be used in accordance with aspects of the present invention.
Figure 7A:
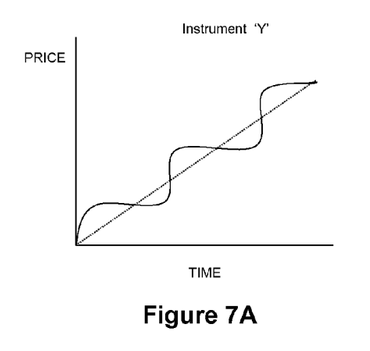
FIGS. 7A-7D are graphs that illustrate volatilities and trends in an example market for financial instruments.
Figure 7B:
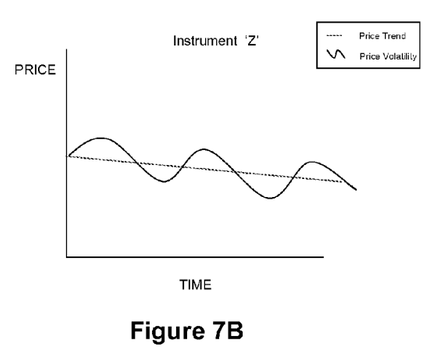
Figure 7C:
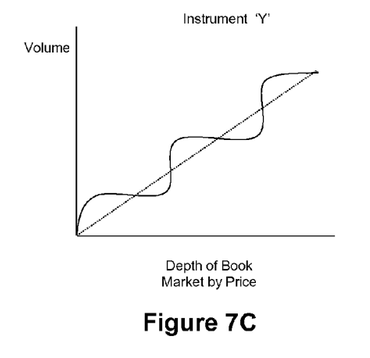
Figure 7D:
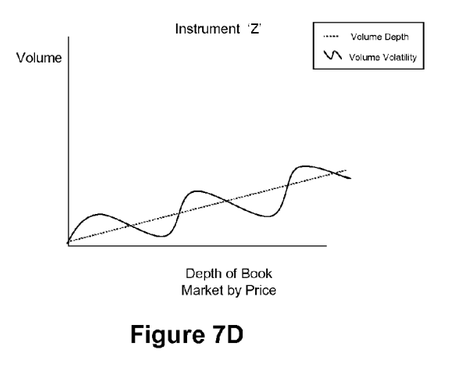

FIG. 6 shows an application programming interface and trading terminal that may be used in accordance with aspects of the present invention. An illustrative trading terminal 624 may be a processing device that provides an interface for a trader and includes some type of hardware interface device or devices 628 (keyboard, mouse, trackball, microphone with voice recognition software, and the like).

Also, the trading terminal 624 may be an automated terminal that does not have a user interface but only handle transactions in an automated fashion for a trader. The trading terminal 624 may not be a "terminal" in the traditional sense, but rather may be a software application which performs automated trading based on rules embodied in its software (so-called "black-box" proprietary trading).

The trading terminal 624 may exchange messages with other components of the system through network 612 using application programming interfaces 614. The application programming interfaces may include, but are not limited to, the following.

First, market information 616 may be provided to the trading terminal 624 for display on display 626. The market information may be transmitted in various ways including only as a singular book, a book followed by incremental updates to the book, and the like. The display of market information may include the order book, trades in the market, price history, high and low prices for instruments, and associated volumes.

Next, API 614 supports order entry capabilities 618 that allow a trader to create order messages to be transmitted to the network 612. The order entry functions may include entering limit orders, entering market orders, entering spread orders, entering contingent orders, and canceling of previously submitted Orders.

Further, API 614 may include the handling of trade reports 620. The handling of trade reports 620 may include information that flows upstream from the trading terminal 624 to the network 612 specifying which report or types of reports are desired and/or the delivery of the reports. The reports may be static or dynamic (receiving real-time information from a remote source and incorporating it into the information displayed to a trader) as is known in the art. For instance, the reports may include information regarding executed orders and fulfillment of settlement obligation summaries.

Finally, API 614 may include support for additional applications 622 that may aid the trader in understanding new market information and additionally executing trades in the system. The additional applications may include applications that provide analytical information or charts to automated trading programs and/or algorithmic trading programs. Further, the additional applications may provide analytical tools for the traders. For example, the additional applications may calculate and/or provide indications of the probability of success for the trader to complete a single-leg transaction (either on its own or part of a multi-leg transaction) and/or a success metric for completing a desired multi-leg trade.

5. OVERVIEW OF AN EXAMPLE MULTI-LEG TRADE

Figure 3:
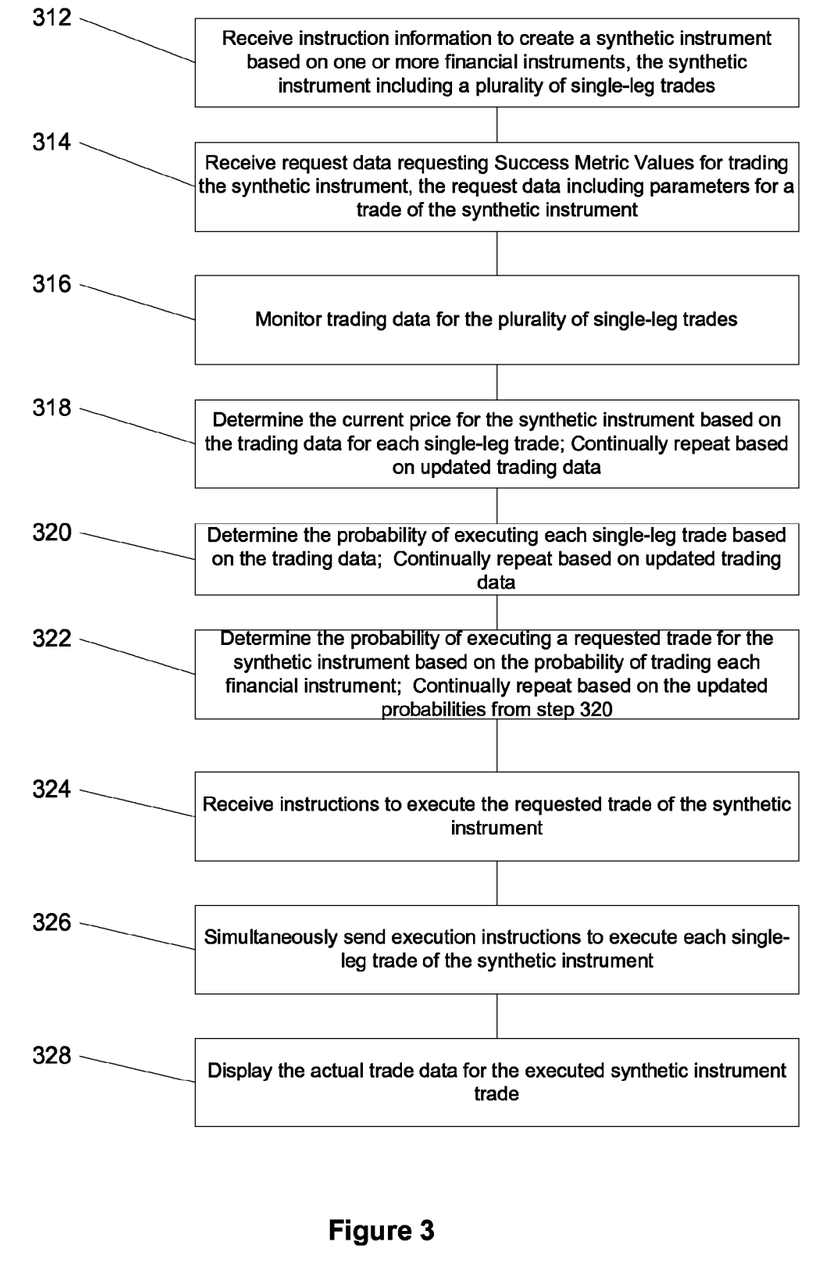
FIG. 3 shows various message flows and interfaces regarding success metrics for multi-leg trading in accordance with aspects of the present invention.

FIG. 3 illustrates steps that could be performed by electronic trading system 110 and/or trading terminal 112 pertaining to a success metric for multi-leg trades (SMMT). As shown for step 312, the trading system or trading terminal receives information to create a synthetic instrument. The synthetic instrument could be created by the trader. Further, the synthetic instrument could be created on his behalf by someone else within his organization or by the service provider. The synthetic instrument includes a plurality of single-leg trades of one or more financial instruments. As an example for illustration purposes, let's assume the synthetic instrument includes differing quantities of two underlying instruments: Synthetic1=(1×Instrument1)+(2×Instrument2).

If a trader were to buy a quantity of ten Synthetic1, this would equate to a purchase of ten of Instrument1 and twenty of Instrument2. If a trader were to sell a quantity of one hundred Synthetic1, this would equate to a sale of one hundred Instrument1 and two hundred Instrument2.

The synthetic instrument could comprise of any number of underlying instruments in varying volumes and combinations of buy and sell, e.g. Synthetic2=(3×Instrument1)+(2×Instrument2)−(5×Instrument3).

The trader typically would want to know the price for purchasing a quantity of 50 Synthetic1. To do so, the trader could open a purchase order entry form (not shown) via his trading terminal 112 to request information for purchasing a quantity of 50 of Synthetic1. As such, the trading terminal 112 and/or trading system 110 would perform step 314 of receiving request data requesting Success Metric Values for trading the synthetic instrument, in which the request data would include parameters of the requested trade, such as the quantity of Synthetic1. The trading terminal and/or trading system could then perform the step 316 of monitoring trading data for each financial instrument of the synthetic instrument, which would be Instrument1, Instrument2 and Instrument3 in the present example.

Based on the trading data received by the trading system and/or trading terminal, the trading system or trading terminal could do the following: Step 318, calculate the current price for the synthetic instrument based on the trading data; Step 320, calculate the probability of executing the requested trade at the current price or at a requested price for each instrument; and Step 322, calculate the probability of executing the requested trade for the synthetic instrument at the current price based on the probability of trading each financial instrument at their current prices (i.e., the Success Metric Values for performing the multi-leg trades of the synthetic instrument). Trading terminal 312 could display the current price for purchasing a quantity of one Synthetic1 and the Success Metric probability value indicating the likelihood of success for purchasing this quantity at the current price or at a desired price entered by the trader, such as via the purchase order entry form.

FIG. 4A illustrates a sample display of trading terminal 112. In the example shown in FIG. 4A, the display shows the current price for each one of Instrument1, Instrument2 and Instrument3 of the Synthetic Instrument, as well as the probability of completing each of the trades at the desired price. The trader could increase the quantity of the Synthetic Instrument to 50, which would cause the purchase price to be recalculated along with the Success Metric probability value for the new quantity. The price data and probabilities would preferably be updated substantially in real-time based on the data received for each of the Instrument1, Instrument2 and Instrument3.

The trader considers both the purchase price and the Success Metric probability value displayed on the trading terminal and, if acceptable, hits the trade button. As such, the trading terminal 112 performs the step of 324 of receiving instructions to execute the requested trade of the synthetic instrument, such as Synthetic1. The trading terminal then performs the step 326 of simultaneously sending execution instructions to trade each financial instrument of the synthetic instrument according to the requested trade parameters. The trader then receives a confirmation detailing the successful purchase of 50 Synthetic1 and the actual price that he has paid. This can be done via trading terminal 112 performing the step 328 of displaying the actual trade data for the executed synthetic instrument.

The Success Metric probability value for Synthetic1 is produced from a calculation involving the Success Metric probability value for Instrument1 and the Success Metric probability value for Instrument2. In the above example a simple multiplication was used.

SM(Synthetic1)=SM(Instrument1)×SM(Instrument2).
For example, if SM(Instrument1) equals 95% and SM(Instrument2) equals 87% then SM(Synthetic1) would equal 82.65%.

The Success Metric probability values for Instrument1 and Instrument2 will vary based upon how liquid trading in these instruments is at a particular point in time. If the frequency of trade is high and the depth of market is high then the Success Metric probability will be high. If the frequency of trade is low and the depth of market is low then the Success Metric probability will be low. If the trader wants to trade a very large volume then the Success Metric probability will be lower than if he wanted to trade a very small volume.

Figure 2:
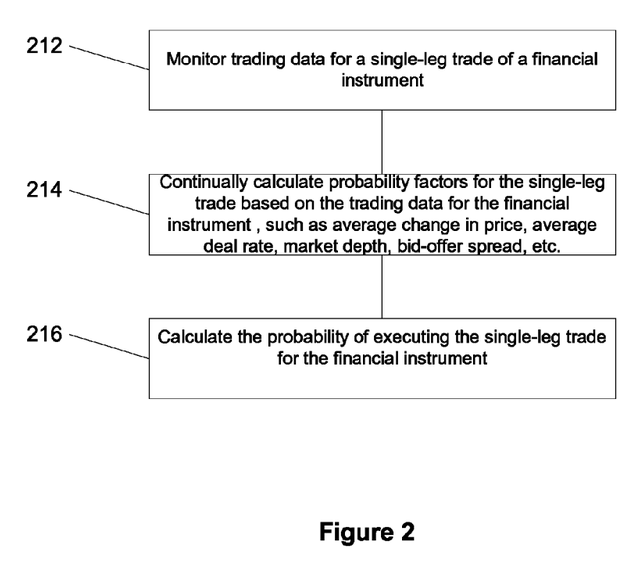
FIG. 2 shows various message flows and interfaces regarding calculating the probability of success for executing a trade in accordance with aspects of the present invention.

The Success Metric probability values for Instrument1 and Instrument2 would therefore be calculated based on a formula involving a number of variables that may include current price, volume to be traded, depth of market and frequency of trade. As shown in FIG. 2, trading terminal 112 and/or trading system 110 can perform the step 212 of monitoring trading data for the financial instrument of a single-leg trade. The trading terminal and/or trading system can also perform the step 214 of continually calculating probability factors for the single-leg transaction based on the trading data, such as average change in price, average deal rate, market depth, bid-offer spread, etc. Based on the calculated probability factors, the trading terminal and/or trading system can perform the step 216 of calculate/re-calculating the probability of executing the single-leg trade, for example at the current price for the financial instrument.

Figure 4C:
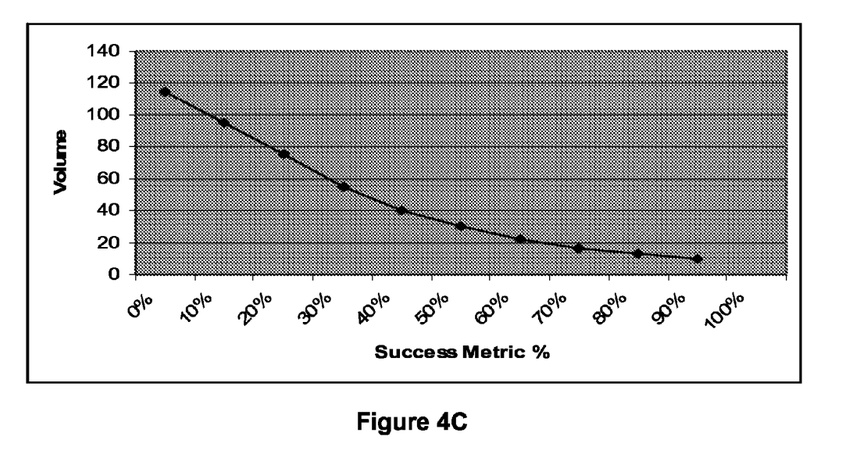
Figure 5:
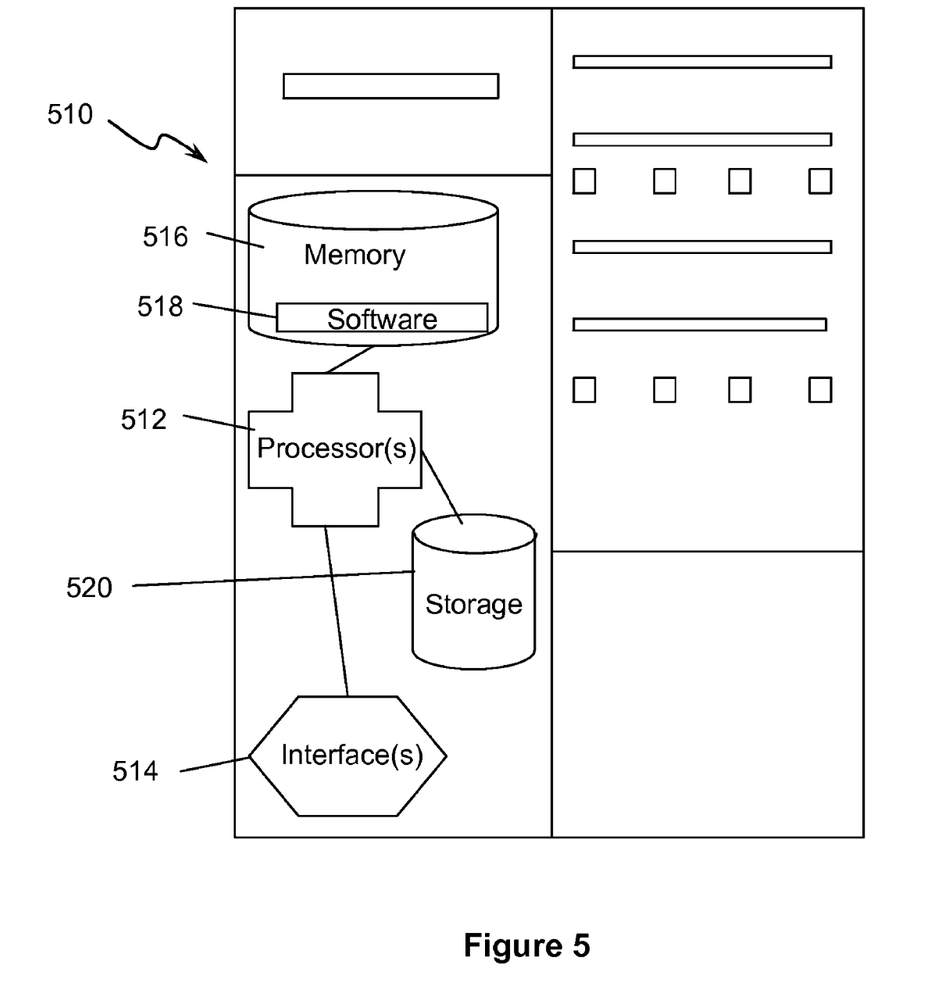
FIG. 5 shows a functional block diagram of an example computing entity of the overview system FIG. 1.

When the trader first opens the purchase order entry form with a quantity of one, the Success Metric probability is calculated based upon this volume. As the trader increases the volume to fifty the Success Metric probability is recalculated. As the volume is increased we would expect the Success Metric probability for the Synthetic to decrease. This could be represented graphically to the trader according to the graph shown in FIG. 4C. As illustrated, the likelihood of successfully completing the multi-leg transaction may decrease as the volume increases. Based upon the trader's appetite for risk, he could use this chart to determine the volume he is willing to trade. Similarly the more the trader is willing to pay for a given volume, and assuming the market depth is available, the more likely he is to achieve his trade.

6. EXAMPLES

The following are illustrative examples of multi-leg trades and success metric calculations related to the same.

Example 1

The following example is of a synthetic trade (x) consisting of 2 legs (y and z) where the relative volumes of each leg are fixed in a ratio x=y+2z. The factors that influence the probability of each leg being executed include (but are not limited to) the following: The volume available in the order book(s) of accessible markets; the price levels for each of the above volumes; the volatility of the price; the volatility of volume at the price; and the price trend (within the desired trading window).

If we start by disregarding volatilities, trends and the possibility of someone else hitting the offers for y and z, then at any one point in time if available volumes of y and z exceeds required volumes there is a theoretical price of x that can be 100% achieved for buying a required volume of x (e.g. 100 units), determined by the available offers of the underlying legs (y and z), as illustrated below in Tables 1 and 2.

TABLE 1

| Synthetic X Volume | Price | SMMT | BUY Time |
|---|---|---|---|
| 100 | 7.2 | 100% | |

| Leg y Volume | Price | BUY % | Leg z Volume | Price | BUY % |
|---|---|---|---|---|---|
| 100 | 3.2 | 100% | 200 | 9.2 | 100% |

TABLE 2

| Y Depth of Book | | Z Depth of book | |
|---|---|---|---|
| Volume | Price offered | Volume | Price offered |
| 80 | 3 | 160 | 9 |
| 50 | 4 | 80 | 10 |
| 70 | 5 | 70 | 11 |
| 150 | 6 | 30 | 12 |

To purchase 100 contracts of x would need to take all 80 contracts shown at 3 and 20 at 4. The average price achieved for the first leg would be calculated as follows:

80*3=240;

20*4=80;

Total=320;

320/100=3.2 Price per contract.

To purchase 200 contracts of y would need to take all 160 contracts shown at 9 and 40 at 10. The average price achieved for the first leg would be calculated as follows:

160*9=1,440;

40*10=400;

Total=1,840;

1,840/200=9.2 Price per contract.

On the basis that the synthetic instrument x is defined as y+2z, the value of x per contract is 7.2.

If we now introduce the requirement to achieve a target price which is better than that available currently in the market within a 2 hour trading window, and introduce the dynamic factors of volatility and price trends we can compute the SMMT value for x by considering the combined probabilities of achieving the price/volume targets of the underlying legs (y and z). FIGS. 7A-7D illustrate how volatilities and trends could affect both price and volume of the underlying legs.

Given the impact of the volatilities and trends shown in FIGS. 7A-7D, and an adjusted target price for x of say 6.6 (as opposed to 7.2), the SMMT value would be computed from the combined probabilities of achieving the revised targets for each underlying leg, which is illustrated on Table 3.

TABLE 3

| SyntheticX Volume | Price | SMMT | BUY Time |
|---|---|---|---|
| 100 | 6.2 | 43.2% | |

| Leg y Volume | Price | BUY % | Leg z Volume | Price | BUY % |
|---|---|---|---|---|---|
| 100 | 2.2 | 72% | 200 | 6.2 | 60% |

Given that at time zero the order book has not changed, the SMMT value calculation considers the likely impact of the volatilities and trends such that the conditions in the orderbooks of the underlying legs will change over the next 2 hours to achieve the synthetic target goal of 6.2 for the desired volume. The SMMT value updates in real-time as the market conditions change. The trader could either wait until the SMMT value hits 100% and then execute the orders or choose to execute the orders at market price when the SMMT value indicates an acceptable chance of success, e.g. 97.7% (note that depending on the sophistication of the trading system that the trader is using he would either choose to execute the synthetic or each of the underlying legs).

Clearly, as well as varying the price target that the trader wants to achieve for the synthetic, he could also vary the volume and/or trading window to see how the SMMT value changes. He could also enter a desired SMMT value for a given volume and trading window to determine a price.

Example 2

SMMT Model

Conducting multi-leg trades to implement a hedging strategy, spread, or arbitrage opportunity where the trader wants to achieve a specific price and/or volume can be complex. The trader must monitor price, volume and trends for each of the underlying legs to take a view on whether the trade will be achieved. This complexity is increased significantly where the legs of the multi-leg trade vary by currency, or in the case of commodities, by units.

The trader may create a synthetic instrument that calculates a single price and volume for the desired multi-leg trade. In more sophisticated situations the trader may also be able to calculate a synthetic depth of market. This simplifies his view on the market but at the same time masks the activity in the underlying legs of the trade. For example it may not be clear that liquidity or volume is insufficient in one or more of the underlying legs. The trader also has no 'what if' capability to determine the likelihood of achieving a better trade in the near future based upon trends in the underlying legs.

The Success Metric for Multi-leg Trading (SMMT) resolves both of these issues. The SMMT calculation for a multi-leg trade provides the probability of successfully executing that trade at the desired price and volume. In addition, if the trader considers the SMMT value to be too high/low, he can adjust the value and see the resultant impact on the price and/or volume that can be achieved.

In this theoretical example, conducted in an exchange traded market, where market depth is available, the trader wants to conduct a 200 lot multi-leg trade comprising three instruments B, C and D in the following ratios: B+2C−3D. The trader can monitor the depth of market in the three underlying instruments as shown in the Tables 4, 5 and 6 below.

TABLE 4

Instrument B
Depth of Market Display

| Volume | Bid | Offer | Volume |
|---|---|---|---|
| 20 | 22.00 | 23.00 | 90 |
| 80 | 21.00 | 24.00 | 50 |
| 50 | 20.00 | 25.00 | 60 |
| 200 | 18.00 | 26.00 | 20 |
| 70 | 17.00 | 27.00 | 100 |
| 100 | 16.00 | 28.00 | 150 |

TABLE 5

Instrument C
Depth of Market Display

| Volume | Bid | Offer | Volume |
|---|---|---|---|
| 20 | 26.00 | 27.00 | 90 |
| 80 | 25.00 | 28.00 | 130 |
| 120 | 24.00 | 29.00 | 180 |
| 200 | 23.00 | 30.00 | 90 |
| 70 | 22.00 | 31.00 | 130 |
| 320 | 21.00 | 32.00 | 280 |

TABLE 6

Instrument D
Depth of Market Display

| Volume | Bid | Offer | Volume |
|---|---|---|---|
| 100 | 19.00 | 20.00 | 90 |
| 80 | 18.00 | 21.00 | 50 |
| 150 | 17.00 | 22.00 | 120 |
| 270 | 16.00 | 23.00 | 50 |
| 70 | 15.00 | 24.00 | 100 |
| 100 | 14.00 | 25.00 | 270 |

To conduct the multi-leg trade the trader could submit the three 'at market' orders shown below in Tables 7-9.

TABLE 7

Instrument B   Buy

| Volume | Price |
|---|---|
| 200 | 23.85 |

TABLE 8

Instrument C   Buy

| Volume | Price |
|---|---|
| 400 | 28.23 |

TABLE 9

Instrument D   Sell

| Volume | Price |
|---|---|
| 600 | 17.02 |

Or to reduce the complexity of what is monitored the trader may create a synthetic instrument A as follows: A=B+2C−3D. In this case the trader's real-time 'at market' price would be calculated and his order would appear as shown below in Table 10.

TABLE 10

Synthetic A   Buy

| Volume | Price |
|---|---|
| 200 | 29.25 |

Monitoring the synthetic simplifies the order and reduces the amount of information to be processed, but at the expense of a full understanding of changes in the underlying legs. For example, if the bid order depth for instrument D suddenly became thin, pushing the achieved price for the desired volume at that instant down to, say, 15.75, the synthetic price could be moved up significantly to 33.05 even though the frequently monitored BestBid/BestOffer 'touch' prices of all the legs remain broadly flat. Further, if the volume required to satisfy the synthetic instrument was no longer available in the market, the SMMT would reduce to zero or a percentage based on the volume available at a certain average price.

SMMT is generally the probability that the synthetic instrument will be executed successfully at a given price and volume within a specified trading window. As discussed above along with FIG. 3, a step in calculating the SMMT is calculating the probability for successfully executing each of the underlying legs. This may be referred to as the Success Metric for the Single-leg Trade (SMST) and, although not necessarily presented to the trader, it could appear as shown below in Tables 11-13.

TABLE 11

Instrument B   Buy

| Volume | Price | SMST |
|---|---|---|
| 200 | 23.85 | 99% |

TABLE 12

Instrument C   Buy

| Volume | Price | SMST |
|---|---|---|
| 400 | 28.23 | 97% |

TABLE 13

| Instrument D | Sell | |
|---|---|---|
| Volume | Price | SMST |
| 600 | 17.02 | 98% |

Note that in this example for a trading window of zero, i.e. now, the price reflects what is currently in the book for the desired volume. The SMST values for slow moving markets will be close to 100%, but the values for higher velocity markets will be lower, reflecting the increased possibility that market conditions change during the trader's execution process.

SMMT can be calculated based upon the SMST values for each of the underlying legs. In this example SMMT(A)=SMST(B)×SMST(C)×SMST(D).

The trader's order entry ticket could be presented as shown below in Table 14. Here we see that the probability of trading 200 lots at the current market price of 29.25 is 94.1%.

TABLE 14

| Synthetic A | Buy | |
|---|---|---|
| Volume | Price | SMMT |
| 200 | 29.25 | 94.1% |

SMMT provides value in addition to the SMST values. If the current 29.25 market price is not acceptable to the trader he could determine the likelihood of conducting the trade at a limit price of 28.75 within a time period of 2 hours. The SMMT value would then be recalculated on this basis and reflect probability based upon the price/volume/volatility trends for each of the underlying legs. Table 15 below provides such a display. See the Volatility/Trend Model section below for a discussion regarding an example underlying volatility/trend model.

TABLE 15

| Synthetic A | Buy | | |
|---|---|---|---|
| Volume | Price | SMMT | t (mins) |
| 200 | 28.75 | 34.0% | 120 |

Alternatively the trader may consider that the SMMT value is too low and therefore the trade too risky. In this instance shown below in Table 16, the trader could increase the SMMT value to a desired level and therefore determine an alternative price or volume that has a higher probability of success. Here he can see that for a 65% probability of achieving the trade over the next 2 hours he would need to submit his order to buy the synthetic at a limit price of 29.01.

TABLE 16

| Synthetic A | Buy | | |
|---|---|---|---|
| Volume | Price | SMMT | t (mins) |
| 200 | 29.01 | 65.0% | 120 |

Volatility/Trend Model

The following workings illustrate how by considering factors such as price, volatility, and momentum indicators it is possible to systematically calculate a probability of being able to execute a trade at a given price within a future trading window.

The tables below consider the previous 20 2-hour trading windows for each of our three underlying instruments B, C and D of Example 2. In this example, two factors are used: historic volatility over the whole period and momentum given by the rate of change (ROC) over the previous 10 2-hour periods.

As illustrated in Tables 17A and 17B below for the present example, the Volatility for Instrument B is 0.54%—the potential percentage movement of the stock in the next 2-hour period. Further, the Rate of Change for Instrument B is −4.22 indicating a downward trend across the period as a whole. The two factors can be combined to estimate a price at the end of the next 2-hour period of 23.30 with a probability of 1 standard deviation downwards −34.1%.

TABLE 17A

| Instrument B | | | | |
|---|---|---|---|---|
| Last | Mean | Dev | Dev^2 | ROC |
| 25.60 | 24.68 | 0.92 | 0.85 | |
| 25.40 | 24.68 | 0.72 | 0.52 | |
| 25.30 | 24.68 | 0.62 | 0.39 | |
| 24.93 | 24.68 | 0.25 | 0.06 | |
| 25.03 | 24.68 | 0.35 | 0.12 | |
| 24.93 | 24.68 | 0.25 | 0.06 | |
| 24.83 | 24.68 | 0.15 | 0.02 | |
| 24.99 | 24.68 | 0.31 | 0.10 | |
| 25.10 | 24.68 | 0.42 | 0.18 | |
| 25.20 | 24.68 | 0.52 | 0.27 | −1.56 |
| 24.90 | 24.68 | 0.22 | 0.05 | −1.97 |
| 24.70 | 24.68 | 0.02 | 0.00 | −2.37 |
| 24.58 | 24.68 | −0.10 | 0.01 | −1.40 |
| 24.33 | 24.68 | −0.35 | 0.12 | −2.80 |
| 24.13 | 24.68 | −0.55 | 0.30 | −3.21 |
| 24.03 | 24.68 | −0.65 | 0.42 | −3.22 |
| 23.97 | 24.68 | −0.71 | 0.50 | −4.08 |
| 23.92 | 24.68 | −0.76 | 0.58 | −4.70 |
| 23.87 | 24.68 | −0.81 | 0.66 | −5.28 |
| 23.85 | 24.68 | −0.83 | 0.69 | −4.22 |
| 493.59 | 24.68 | | 5.90 | |
| | | | 0.29 | |
| Volatility | | | 0.54 | |

TABLE 17B

| Instrument B | Buy |
|---|---|
| Volume | Price |
| 200 | 23.30 |

As illustrated in Tables 18A and 18B below for the present example, the Volatility for Instrument C is 0.16%—the potential percentage movement of the stock in the next 2-hour period. The Rate of Change for Instrument B is 0.37 indicating an upward trend across the period as a whole. Further, the two factors can be combined to estimate a price at the end of the next 2-hour period of 28.25 with a probability of 1 standard deviation upwards −34.1%.

TABLE 18A

| Instrument C | | | | |
|---|---|---|---|---|
| Last | Mean | Dev | Dev^2 | ROC |
| 28.25 | 28.30 | −0.05 | 0.00 | |
| 28.38 | 28.30 | 0.07 | 0.01 | |
| 28.50 | 28.30 | 0.20 | 0.04 | |
| 28.63 | 28.30 | 0.32 | 0.10 | |
| 28.50 | 28.30 | 0.20 | 0.04 | |
| 28.44 | 28.30 | 0.14 | 0.02 | |
| 28.50 | 28.30 | 0.20 | 0.04 | |
| 28.40 | 28.30 | 0.10 | 0.01 | |
| 28.33 | 28.30 | 0.02 | 0.00 | |
| 28.25 | 28.30 | −0.05 | 0.00 | 0.00 |
| 28.13 | 28.30 | −0.18 | 0.03 | −0.88 |
| 28.06 | 28.30 | −0.24 | 0.06 | −1.54 |
| 28.00 | 28.30 | −0.30 | 0.09 | −2.18 |
| 28.06 | 28.30 | −0.24 | 0.06 | −1.54 |
| 28.19 | 28.30 | −0.11 | 0.01 | −0.88 |
| 28.31 | 28.30 | 0.01 | 0.00 | −0.66 |
| 28.35 | 28.30 | 0.05 | 0.00 | −0.18 |
| 28.30 | 28.30 | 0.00 | 0.00 | −0.09 |
| 28.25 | 28.30 | −0.05 | 0.00 | 0.00 |
| 28.23 | 28.30 | −0.07 | 0.01 | 0.37 |
| 566.04 | 28.30 | | 0.52 | |
| | | | 0.03 | |
| Volatility | | | 0.16 | |

TABLE 18B

| Instrument C | Buy |
|---|---|
| Volume | Price |
| 400 | 28.25 |

As illustrated below in Tables 19A and 19B below for the present example, the Volatility for Instrument D is 0.35%—the potential percentage movement of the stock in the next 2-hour period. The Rate of Change for Instrument B is 1.43 indicating an upward trend across the period as a whole. The two factors can be combined to estimate a price at the end of the next 2-hour period of 17.10 with a probability of 1 standard deviation upwards −34.1%.

TABLE 19A

| Instrument D | | | | |
|---|---|---|---|---|
| Last | Mean | Dev | Dev^2 | ROC |
| 15.90 | 16.61 | −0.71 | 0.51 | |
| 16.00 | 16.61 | −0.61 | 0.38 | |
| 16.10 | 16.61 | −0.51 | 0.26 | |
| 16.20 | 16.61 | −0.41 | 0.17 | |
| 16.30 | 16.61 | −0.31 | 0.10 | |
| 16.45 | 16.61 | −0.16 | 0.03 | |
| 16.50 | 16.61 | −0.11 | 0.01 | |
| 16.50 | 16.61 | −0.11 | 0.01 | |
| 16.65 | 16.61 | 0.04 | 0.00 | |
| 16.69 | 16.61 | 0.08 | 0.01 | 4.97 |
| 16.78 | 16.61 | 0.17 | 0.03 | 4.88 |
| 16.79 | 16.61 | 0.18 | 0.03 | 4.29 |
| 16.75 | 16.61 | 0.14 | 0.02 | 3.40 |
| 16.76 | 16.61 | 0.15 | 0.02 | 2.82 |
| 16.87 | 16.61 | 0.26 | 0.07 | 2.55 |
| 16.99 | 16.61 | 0.38 | 0.14 | 2.97 |
| 17.00 | 16.61 | 0.39 | 0.15 | 3.03 |
| 17.02 | 16.61 | 0.41 | 0.16 | 2.22 |
| 17.01 | 16.61 | 0.40 | 0.16 | 1.92 |
| 17.02 | 16.61 | 0.41 | 0.16 | 1.43 |
| 332.28 | 16.61 | | 2.42 | |

TABLE 19A-continued

| Instrument D | | | | |
|---|---|---|---|---|
| Last | Mean | Dev | Dev^2 | ROC |
| | | | 0.12 | |
| Volatility | | | 0.35 | |

TABLE 19B

| Instrument D | Sell |
|---|---|
| Volume | Price |
| 600 | 17.10 |

As illustrated in Table 20, the synthetic price can then be calculated using the underlying prices and the ratio −28.48. This price has a SMMT value of 4% given by SMMT(A)=SMST(B)×SMST(C)×SMST(D).

TABLE 20

| Synthetic A | Buy |
|---|---|
| Volume | Price |
| 200 | 28.48 |

Using a linear fit (possible refinement could be a fit based on a standard bell curve distribution or other fit) for the price of the synthetic between 28.48 at 4% probability and 29.25 at 94.1% probability, interim values can be calculated, e.g., the probability of achieving 28.75 can be calculated at 34%, and the probability of achieving 29.00 can be calculated at 64%.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications, and variations within the scope and spirit of the appended claims will occur to persons of ordinary skill in the art from a review of this disclosure.

What is claimed is:

1. A trading terminal in communication with one or more electronic trading systems, the trading terminal comprising:
   memory for storing computer readable instructions;
   one or more network interfaces in communication with one or more electronic trading systems; and
   one or more computer processors in communication with the one or more network interfaces and the memory, the one or more computer processors configured to perform steps comprising:
   monitoring trading data for a plurality of single-leg trades;
   calculating a probability that each single-leg trade in the plurality of single-leg trades will execute, wherein calculating the probability that a particular single-leg trade in the plurality of single-leg trades will execute is based on the monitored trading data;
   calculating a probability of executing a requested trade of a synthetic instrument based on a price of the synthetic instrument at a specific volume to be traded of the synthetic instrument, and based on the probability that each single-leg trade in the plurality of single-legtrades will execute, wherein the synthetic instrument is based on at least one financial instrument and the synthetic instrument includes the plurality of single-leg trades;

displaying the probability of executing the requested trade for the synthetic instrument including displaying the probability of executing each of the plurality of single-leg trades;

receiving instructions to execute the requested trade of the synthetic instrument; and simultaneously sending execution instructions to execute each of the plurality of single-leg trades of the synthetic instrument.

2. The trading terminal of claim 1, wherein the one or more computer processors are configured to perform the further step of receiving request data requesting the probability of executing the requested trade of the synthetic instrument, the request data including parameters for the requested trade of the synthetic instrument.

3. The trading terminal of claim 2, wherein the parameters include a quantity of the synthetic instrument.

4. The trading terminal of claim 2, wherein the one or more computer processors are configured to perform the further step of receiving instruction information to create the synthetic instrument.

5. The trading terminal of claim 4, wherein the instruction information includes the request data.

6. The trading terminal of claim 4, wherein the instruction information includes quantities of the plurality of single-leg trades for the synthetic instrument.

7. The trading terminal of claim 1, wherein the synthetic instrument is an arbitrage trade of a single financial instrument.

8. The trading terminal of claim 1, wherein the trading data includes probability information indicating the probability of executing each single-leg trade in the plurality of single-leg trades.

9. The trading terminal of claim 1, wherein the trading data is continually updated and the one or more computer processors are configured to repeatedly perform the steps of calculating the probabilities based on updated trading data.

10. The trading terminal of claim 9, wherein the step of calculating the probability of executing the requested trade of the synthetic instrument is repeated when the trading data is updated for one of the plurality of single-leg trades.

11. The trading terminal of claim 9, wherein the step of calculating the probability of executing the requested trade of the synthetic instrument is repeated at a preset interval.

12. The trading terminal of claim 1, wherein the one or more computer processors are configured to perform the further step of displaying actual trade data of an executed trade of the synthetic instrument.

13. A computer-implemented method for trading a synthetic instrument via an electronic trading system, the method comprising:

monitoring trading data for a plurality of single-leg trades;

calculating, by a processor, a probability that each single-leg trade in the plurality of single-leg trades will execute, wherein calculating the probability that a particular single-leg trade in the plurality of single-leg trades will execute is based on the monitored trading data;

calculating, by the processor, a probability of executing a requested trade of a synthetic instrument based on a price of the synthetic instrument at a specific volume to be traded of the synthetic instrument, and based on the probability that each single-leg trade in the plurality of single-leg trades will execute, wherein the synthetic instrument is based on at least one financial instrument and the synthetic instrument includes the plurality of single-leg trades;

providing the probability of executing the requested trade for the synthetic instrument including displaying the probability of executing each of the plurality of single-leg trades;

after providing the probability, receiving instructions to execute the requested trade of the synthetic instrument; and simultaneously sending execution instructions to execute each of the single-leg trades of the synthetic instrument.

14. The computer-implemented method of claim 13, further comprising receiving request data requesting the probability of executing the requested trade of the synthetic instrument, the request data including parameters for the requested trade of the synthetic instrument.

15. The computer-implemented method of claim 14, wherein the parameters include a quantity of the synthetic instrument.

16. The computer-implemented method of claim 13, wherein the trading data is continually updated and the method further comprises repeatedly performing the steps of calculating the probabilities based on updated trading data.

17. The computer-implemented method of claim 14, further comprising receiving instruction information to create the synthetic instrument.

18. The computer-implemented method of claim 17, wherein the instruction information includes the request data.

19. The computer-implemented method of claim 17, wherein the instruction information includes quantities of the plurality of single-leg trades for the synthetic instrument.

20. The computer-implemented method of claim 13, wherein the synthetic trade is an arbitrage trade of a single financial instrument.

21. The computer-implemented method of claim 13, wherein the trading data includes probability information indicating the probability of executing each of the plurality of single-leg trades.

22. The computer-implemented method of claim 16, wherein calculating the probability of executing a requested trade of a synthetic instrument is repeated when the trading data is updated for one of the plurality of single-leg trades.

23. The computer-implemented method of claim 16, wherein calculating the probability of executing a requested trade of a synthetic instrument is repeated at a preset interval.

* * * * *